G. R. DE NISE.
LIFE CABIN.
APPLICATION FILED AUG. 16, 1912.
1,088,331.
Patented Feb. 24, 1914.
2 SHEETS—SHEET 1.
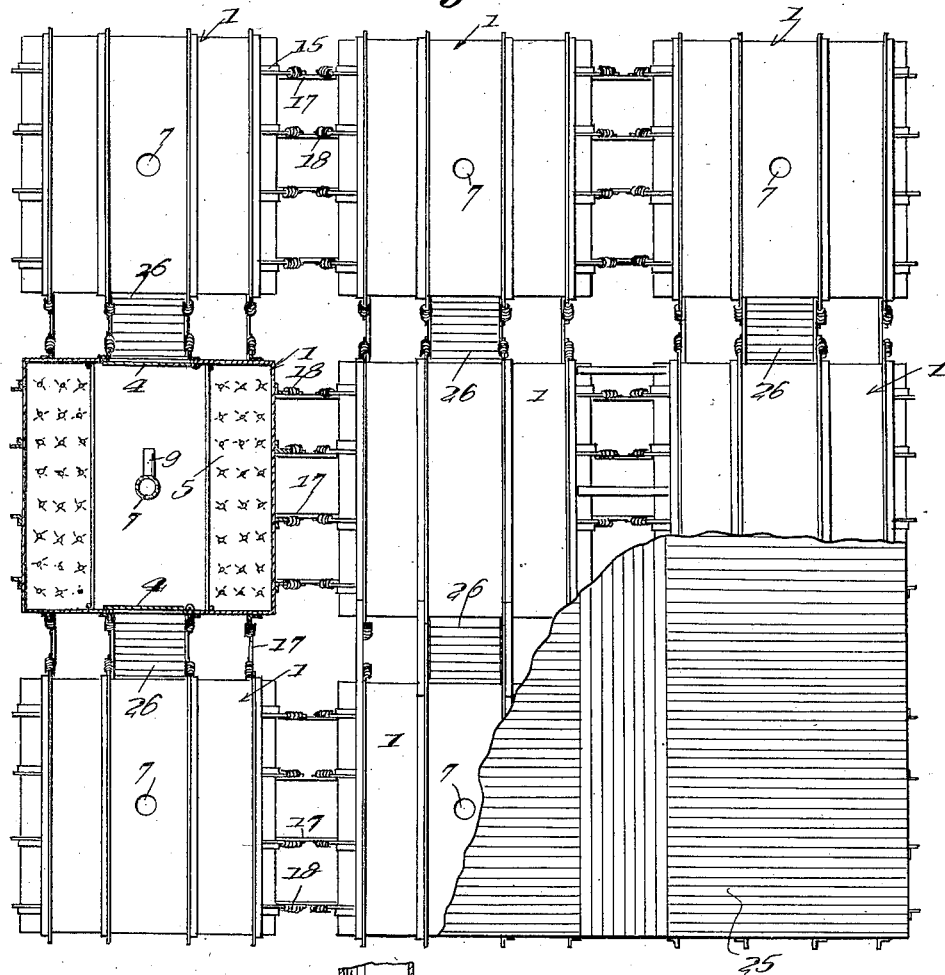
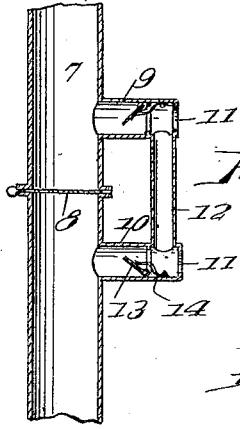
Witnesses
Inventor
George R. DeNise,
Attorney G. R. DE NISE.
LIFE CABIN.
APPLICATION FILED AUG. 16, 1912.
1,088,331.
Patented Feb. 24, 1914.
2 SHEETS—SHEET 2.
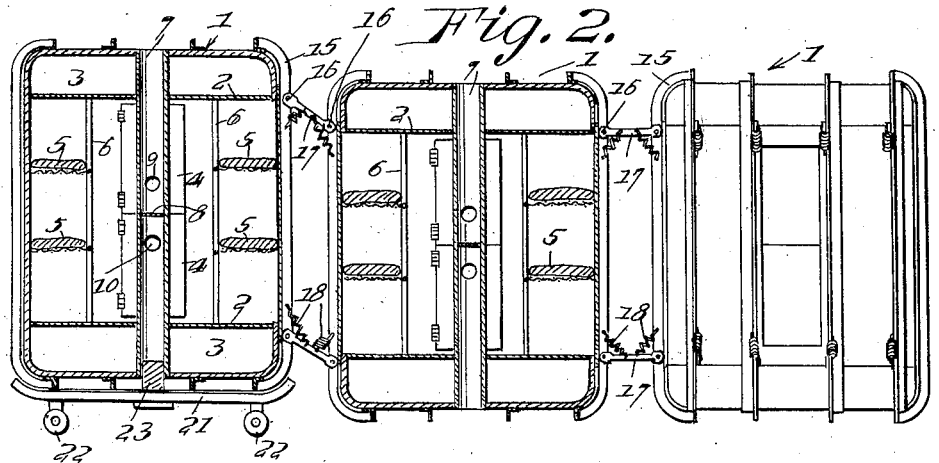
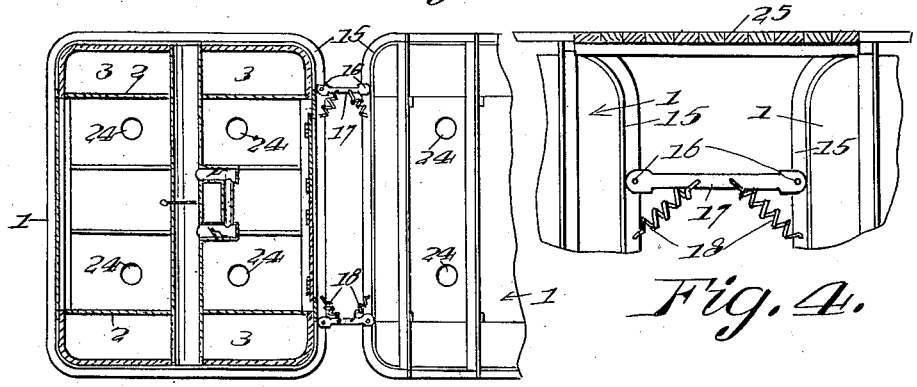
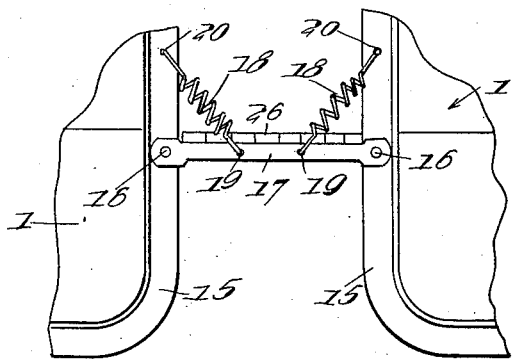
Witnesses
C. D. F. Brown.
M. A. Bond.
Inventor
George R. DeNise,
By W. E. Boulter
Attorney
COLUMBIA PLANOGRAPH CO., WASHINGTON, D. C.

UNITED STATES PATENT OFFICE.

GEORGE R. DE NISE, OF BOULDER, WYOMING.

LIFE-CABIN.

1,088,331.     Specification of Letters Patent.     Patented Feb. 24, 1914.

Application filed August 16, 1912. Serial No. 715,426.

*To all whom it may concern:*

Be it known that I, GEORGE R. DE NISE, a citizen of the United States, residing at Boulder, in the county of Fremont and State of Wyoming, have invented certain new and useful Improvements in Life-Cabins, of which the following is a specification.

This invention relates to certain new and useful improvements in means for saving life at sea.

The present invention has for its objects among others to provide simple and efficient means for saving lives at sea which may be readily launched, or in case of sudden sinking of the ship, will automatically become detached and float as the ship goes down.

The present invention embodies as its generic principle or feature a fleet or battery or multiplicity of life cabins united articularly, so that each cabin shall have movement independent of the other within certain limits, springs or the like being provided to normally maintain the various life cabins in predetermined relation. Each life cabin is complete in itself, being buoyant and provided with accommodations for any desired number of persons, with means for supplying air as well as for the automatic discharge of any undue excess of water that may perchance find its way into the interior of the cabin. Each cabin has an air-tight compartment at each end which in addition to its efficacy as a buoyant medium will serve as a receptacle for valuables, provisions or other articles.

Each life cabin is properly constructed so as to withstand the greatest strain and by reason of the articulate connections between the various life cabins, should any one or more come in contact with an iceberg or other obstruction in the water, it will yield in one direction or the other so as to render it less liable to injury and also prevent shock or injury to the remaining life cabins of the fleet or battery.

The invention has for a further object to accomplish such ends as are usually sought in the various forms of life saving devices, having in mind also efficiency and strength as well as cheapness of manufacture, comfort of occupants and means for escape from any one of the life cabins to another in case of puncture of the one cabin, or for any other reason.

Other objects and advantages of the invention will hereinafter appear and the novel features thereof will be particularly pointed out in the appended claims.

The invention is capable of embodiment in a variety of forms and the details of construction thereof may manifestly be varied within wide limits. In the present instance, I have shown in the accompanying drawings what at the present time I consider the preferable form of construction, such form, however, being herein shown merely for the purpose of illustration and without in any way desiring to restrict myself to the particular construction, details, proportions of parts etc.

The invention in such preferred form is clearly illustrated in the accompanying drawings, which, with the numerals of reference marked thereon, form a part of this specification, and in which—

Figure 1 is a top plan with parts in section and portions broken away showing a fleet of life cabins. Fig. 2 is a substantially central vertical section through two cabins, a third being shown in elevation and one of the cabins supported upon a wheeled truck. Fig. 3 is a vertical section at right angles to Fig. 2, showing one of the cabins in vertical section and the other in elevation. Fig. 4 is an enlarged detail partly in section, showing the upper portions of two connected cabins. Fig. 5 is an enlarged detail in elevation showing the lower portions of two connected cabins. Fig. 6 is an enlarged vertical section of the air shaft and the valved passages connected therewith.

Like numerals of reference indicate like parts throughout the several views.

One of the principal objects sought is to adapt the cabins to every day use *en route*, being applicable at all times and so constructed as to supplant the lifeboats now carried by vessels and thus valuable space heretofore practically wasted may be utilized.

While one of the life cabins may be used singly, it is preferred to assemble them in batteries or fleets. The connecting devices employed are of such a nature that a fleet can be assembled or made up of any desired number of cabins, and a fleet of any number may be readily increased to a fleet of a greater number simply by rolling the additional cabins into position and joining or coupling them to the others. In this instance, I have chosen to show a fleet as made up of nine of my novel form of life cabins, but it is evident that a fleet may embody sixteen or twenty-five cabins or it may be composed of a greater number in one direction than the other, for instance there may be three cabins abreast and three, four, five or more extending in the direction of the length of the fleet, the essence of the invention, however, remains irrespective of the number of life cabins connected to form the fleet.

The fleet as preferably constructed is invertible, that is capable of riding either side up equally well. The cabins are constructed so as to withstand great pressure with minimum submergence. In case of puncture of any cabin, such cabin would be sustained by the fleet and the water would not rise in said cabin higher than the water line or line of displacement of the fleet. Provision is made for the ready egress of the occupants of such punctured cabin in case of such accident.

The occupants may be held by straps or other means at the time of launching. I provide doors and port holes which are made water-tight for an obvious purpose.

As the cabins are all alike in their general construction, a detail description of one will suffice for all. Each cabin, which may be of any desired dimensions and capable of sustaining and accommodating a greater or less number of persons, is constructed of suitable material with heavy steel plate on the exposed sides, that upon the side adjacent the adjoining fleet not necessarily being as heavy. Each cabin 1 has a ceiling or flooring 2 leaving an air-tight chamber 3 constituting a storage vault for valuables, food, water etc., there being one of these floors or ceilings and one of these storage vaults or chambers at the top and bottom of the cabin. Access may be had to these storage vaults or chambers in any well known or suitable manner. Each cabin is provided with one or more sets of doors, preferably one, these doors 4 being movable independent of each other and one disposed above the other, as seen in Fig. 2, for obvious reasons. These doors are constructed so as to close water-tight.

Each cabin may have four or more bunks or berths 5, as seen in Fig. 2, posts or stands 6 being provided to support the outer edges of the berths or bunks.

Extending preferably centrally through each life cabin is an air shaft 7 open at both ends and provided at a point substantially at its midheight with a cut-off valve 8 which is normally open but which is designed to be closed when using the lower section of the shaft as a cess-pipe. This air shaft is preferably a steel tube running entirely through the cabin and remaining open at both ends. After the fleet is launched, the upper end of this shaft may be used to supply air and the lower end as a cess-pipe.

Near its midheight and upon opposite sides of the central valve 8, I provide branches 9 and 10, the outer ends of which are open, as seen at 11, and these two branches being connected near their outer ends by a vertical pipe 12, so as to afford communication between the two branches. In each branch is a valve 13 normally held open by suitable means, as a spring 14. Both of these valves are designed to be closed at the time of launching or when the cabins are submerged. By opening the valve 8, water will drop to the line of displacement below the branch 10 and the air will be admitted through the branch 9 into the interior of the cabin. With the valve 8 open, the water entering the shaft 7 would automatically close the valve 13 by pressure thereagainst. In case the valve 8 is open and water rises in the shaft up to the branch 9, the water would escape through the branch 9 and through the pipe 12 into the branch 10 and back into the air shaft. It is believed, however, that submergence would not be sufficient to force the water above the branch 9.

I would state that the valves shown are simply illustrative. In practice they are easily constructed so that the least flow of water into the branches 9 and 10 will operate to close the valves automatically. There is supposed to be no leakage through these branches into pipe 12 except of a dripping character. Of course the openings at 11 can both be provided with plugs or any simple means of closing them. The idea is to receive air through the upper branch and discharge sewage through the lower if desired when the cabins are not being submerged. The pipe 12 is not necessary but I preferably use it as it acts to carry off any leakage which may result, the lower opening 11 being plugged.

Any desired number of cabins constructed and equipped substantially as above described may be resiliently and pivotally united. This may be accomplished in a variety of ways, that herein shown being at the present time considered a very efficient one. For this purpose the cabins are shown as provided upon their outer sides with ribs or the like 15 to which are pivotally connected, as at 16, the opposite ends of rods or links 17 which join two adjacent cabins. These links or rods may be of any desired number, and as shown in Fig. 2, are disposed upon all four sides of the central cabin and upon the adjacent sides of two of the others so that the cabins are pivotally connected to form what I term a "fleet," so that any one cabin may have movement in any direction independently of the other. Springs 18 are employed, two for each link or rod 17, as shown best in Fig. 5. These springs tend to normally hold the cabins in their horizontal and vertical alinement with each other but permit of the various movements required. Each spring has one end connected to a rod or link 17, as shown at 19, and its other end connected in any suitable manner with a rib 15 of the adjacent cabins, as shown at 20, see Fig. 5. By means of this resilient connection, safety is assured, for in striking rocks, or other obstructions the impact is relieved by the rebound of the unit. Also the violent action of the water will be reduced as it passes between the cabins and the resilient units will ride easier than a rigid craft. A fleet thus constructed (or any desired number of such fleets) can be carried on the vessel, either between decks, or on the upper deck, or both, and can be launched in emergency, in any suitable manner. They can be so constructed as to meet the requirements of any class of passengers *en route*. The fleet can be launched right side up under any conceivable conditions but will answer equally as well if inverted under any conditions.

The cabins, either singly or arranged in the form of fleets, may be supported and secured upon the vessel in any suitable manner, it not being deemed necessary to herein illustrate any means for thus affixing the life cabins upon the decks. I have shown in Fig. 2 at the left one of the cabins supported upon a wheeled truck 21, the wheels 22 of which are designed to rest upon the deck, the truck being provided with a vertical post or the like 23 entering the lower end of the air shaft 7 of the cabin and holding the latter in position. When the fleet is launched, the truck will automatically detach itself, the post dropping out of the air shaft leaving the cabin free to float upon the water.

Each cabin may be provided with one or more port holes, as seen at 24 in Fig. 3.

The connections between the life cabins should all have ample play, and the passageways between two adjacent cabins should be of proper width dependent upon the size of the cabins and other conditions.

When stored upon the upper deck, a suitable temporary roof, as seen at 25 in Fig. 4, may be employed, supported in any suitable manner and readily destructible or so supported as to float off, when the fleet is launched. The passageways may be likewise provided with suitable flooring, as seen at 26 in Fig. 5, as well as in Fig. 1, which may be made so as to float off when the fleet is launched or may be of such open nature as to permit of the ready passage of the water between the cabins, in which latter instance this floor or support might be of a permanent nature.

From the foregoing, it will be seen that I have devised a novel and efficient means of saving life at sea and at the same time provided a cabin habitable at all times so that the space occupied thereby can be readily utilized *en route*, and while the practical embodiment of my invention as hereinbefore disclosed is what I at the present time consider preferable, it is evident that the same is subject to changes, variations and modifications in detail, proportions of parts, etc., without departing from the spirit of the invention or sacrificing any of its advantages. I, therefore, do not wish to confine myself to the exact form, proportions, etc., as hereinbefore described, but reserve the right to make such changes, variations and modifications etc. as come properly within the scope of the protection prayed.

What is claimed as new is:—

1. A fleet of buoyant invertible life cabins articularly and resiliently joined, said cabins being spaced apart with passageways therebetween.

2. A fleet of buoyant invertible life cabins articularly and resiliently joined, said cabins being spaced apart with passageways therebetween, and floors between adjacent cabins.

In testimony whereof I affix my signature in presence of two witnesses.

GEORGE R. DE NISE.

Witnesses:
E. H. BOND,
CHARLES LOWELL HOWARD.

---

Copies of this patent may be obtained for five cents each, by addressing the "Commissioner of Patents, Washington, D. C."